(12) United States Patent
Illouz

(10) Patent No.: US 10,014,674 B1
(45) Date of Patent: Jul. 3, 2018

(54) RECESSED WALL MOUNTING APPARATUS AND METHOD

(71) Applicant: Shalom Illouz, Los Angeles, CA (US)

(72) Inventor: Shalom Illouz, Los Angeles, CA (US)

(73) Assignee: Seeless Solutions, Inc., Los Angeles, CA (US)

( * ) Notice: Subject to any disclaimer, the term of this patent is extended or adjusted under 35 U.S.C. 154(b) by 0 days.

(21) Appl. No.: 15/642,205

(22) Filed: Jul. 5, 2017

(51) Int. Cl.
*H02G 3/12* (2006.01)
*F16M 13/02* (2006.01)

(52) U.S. Cl.
CPC .............. *H02G 3/12* (2013.01); *F16M 13/02* (2013.01)

(58) Field of Classification Search
CPC ................................. H02G 3/12; F16M 13/02
USPC .............................................. 174/53, 54, 50
See application file for complete search history.

(56) References Cited

U.S. PATENT DOCUMENTS

| | | | | |
|---|---|---|---|---|
| 4,410,004 A * | 10/1983 | Kifer | ..................... | D06F 39/08 137/360 |
| 4,519,667 A * | 5/1985 | Canning | ............ | H01R 13/6453 439/681 |
| 6,747,206 B1 * | 6/2004 | Law | ..................... | H01R 13/748 174/50 |
| 7,880,097 B2 * | 2/2011 | Moore | ................. | G11B 33/142 174/480 |
| 8,881,468 B2 * | 11/2014 | McMullen | ................ | E06B 1/62 248/224.8 |

* cited by examiner

*Primary Examiner* — Dhirubhai R Patel
(74) *Attorney, Agent, or Firm* — Cotman IP Law Group, PLC

(57) ABSTRACT

A recessed wall mounting apparatus and method are presented. The invention includes a housing unit coupled with a mounting ring. The housing unit has a base wall with a front side having an outwardly extending perimeter wall from each side of the base wall to form a recessed compartment. The perimeter wall terminates in an outer edge that is configured to be flush with a drywall of an architectural structure. The base wall has an access hole configured substantially in alignment with an accessory window in the mounting ring. The mounting ring is configured for removably mounting an accessory device, e.g. light switch, to the accessory window. One or more removable and adjustable wall brackets are coupled to one or more sides of the housing unit for securing the housing unit to the wall of the architectural structure.

16 Claims, 15 Drawing Sheets

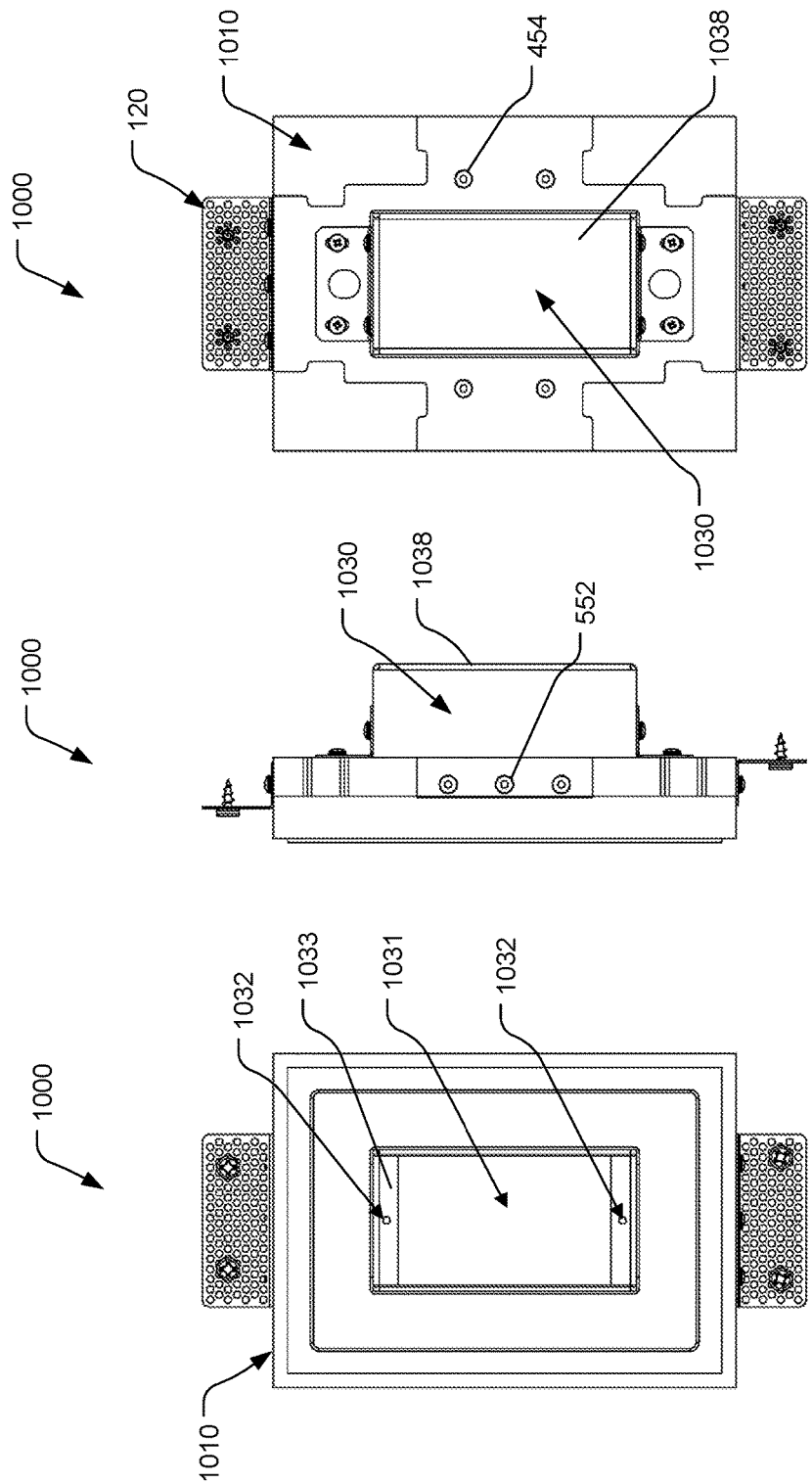

RECESSED WALL MOUNTING APPARATUS AND METHOD

BACKGROUND OF THE INVENTION

Field of the Invention

Embodiments of the invention relates to the field of architectural fixtures. More specifically, the invention relates to recessed wall mounting fixtures.

Description of the Related Art

There are currently no known systems that provide recessed wall mounting that is flush with and blends with the drywall of an architectural structure. Current wall mounting systems are either not recessed or are not flush mounted with the drywall of an architectural structure, e.g. home, office, etc. Recessed mounting systems in the marketplace usually overhang the wall. That is, there is usually a flap or flange on the outside of the wall or ceiling.

BRIEF SUMMARY OF THE INVENTION

One or more embodiments of the invention are directed a recessed wall mounting apparatus and method. The invention is a fixture for recess mounting of an assorted variety of devices, e.g. architectural fixtures, so that they are more concealed and less obtrusive. The fixture may be coupleable to a wall of an architectural structure, e.g. drywall, and comprises an overmold material that blends with the drywall.

One or more embodiments comprises a mounting ring embedded into a housing unit. The ring is generally a flat plate with an accessory window configured for removably mounting an accessory device.

The accessory devices may be standard devices that mount in standard box sizes with different shapes of mounting rings, e.g. round and rectangular. In one or more embodiments, the accessory device includes electrical outlets, switches (e.g. light), phone jacks, network jacks, TV outlets, HVAC grills, sensors (e.g. motion and occupancy), sprinklers, smoke detectors, speakers, keypads, lights, and thermostats.

In one or more embodiments, the housing unit is fixedly coupled to the mounting ring. For example, the housing unit may be an overmold on the mounting ring. The overmold could be Gypsum or other plaster materials, e.g. plastic, ceramic. The mounting ring may be coupled by other means to the housing unit. For instance, the mounting ring may be bolted onto the backside of the housing unit. The housing unit may be available in different sizes, widths and depths and in different shapes. For example, round, square, rectangular, and other shapes are contemplated and would preferably depend on the device accessory to be mounted therein.

The housing unit comprises a base wall with a front side comprising an outwardly extending perimeter wall from each side of the base wall to form a recessed compartment, and terminating in an outer edge that is configured to be flush with a wall of an architectural structure. In one or more embodiments, the base wall has an access hole configured to be substantially in alignment with the accessory window of the mounting ring.

In one or more embodiments, the housing unit comprises one or more threaded inserts, e.g. insert nuts, secured in the perimeter wall of the housing unit for coupling the one or more wall brackets. The threaded inserts are for coupling one end of one or more adjustable wall brackets to the housing unit using bolts, for example. In one or more embodiments, an adjustable wall bracket is coupled to each one of two or more opposing sides of the housing unit. In one or more embodiments, the wall bracket is L-shaped. The position of the wall bracket is preferably adjustable in an axis perpendicular to the wall of the architectural structure.

The second end of the one or more adjustable wall brackets may be coupled to wall studs or to structural members attached to wall studs.

In one or more embodiments, the housing unit further comprises one or more threaded inserts secured in the backside of the base wall of the housing unit for externally coupling an electrical back box to the backside of the housing unit. The electrical back box may be coupled to the backside of the ring and housing unit for high voltage devices such as power outlets and switches. The one or more threaded inserts in the backside of the base wall may be fixedly coupled to the mounting ring and/or embedded in the housing unit.

In one or more embodiments, the mounting ring without an electrical back box may be used for connecting or mounting low voltage devices to the fixture.

BRIEF DESCRIPTION OF THE DRAWINGS

The above and other aspects, features and advantages of the invention will be more apparent from the following more particular description thereof, presented in conjunction with the following drawings wherein:

FIG. 13A is a front view of the configuration of FIG. 10 of the recessed wall mounting fixture with a back box in accordance with the present invention.

FIG. 13B is a side view of the configuration of FIG. 10 of the recessed wall mounting fixture with a back box in accordance with the present invention.

FIG. 13C is a rear view of the configuration of FIG. 10 of the recessed wall mounting fixture with a back box in accordance with the present invention.

DETAILED DESCRIPTION

The present invention comprising recessed wall mounting apparatus and method will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. Furthermore, although steps or processes are set forth in an exemplary order to provide an understanding of one or more systems and methods, the exemplary order is not meant to be limiting. One of ordinary skill in the art would recognize that the steps or processes may be performed in a different order, and that one or more steps or processes may be performed simultaneously or in multiple process flows without departing from the spirit or the scope of the invention. In other instances, specific features, quantities, or measurements well known to those of ordinary skill in the art have not been described in detail so as not to obscure the invention. It should be noted that although examples of the invention are set forth herein, the claims, and the full scope of any equivalents, are what define the metes and bounds of the invention.

For a better understanding of the disclosed embodiment, its operating advantages, and the specified object attained by its uses, reference should be made to the accompanying drawings and descriptive matter in which there are illustrated exemplary disclosed embodiments. The disclosed embodiments are not intended to be limited to the specific forms set forth herein. It is understood that various omissions and substitutions of equivalents are contemplated as circumstances may suggest or render expedient, but these are intended to cover the application or implementation.

The term "first", "second" and the like, herein do not denote any order, quantity or importance, but rather are used to distinguish one element from another, and the terms "a" and "an" herein do not denote a limitation of quantity, but rather denote the presence of at least one of the referenced item.

One or more embodiments of the present invention will now be described with references to FIGS. 1-14.

In one or more embodiments of the invention, the recessed wall mounting apparatus 100 is a fixture for recess mounting of an assorted variety of devices, e.g. architectural fixtures, so that they are more concealed and less obtrusive.

Figure 3:
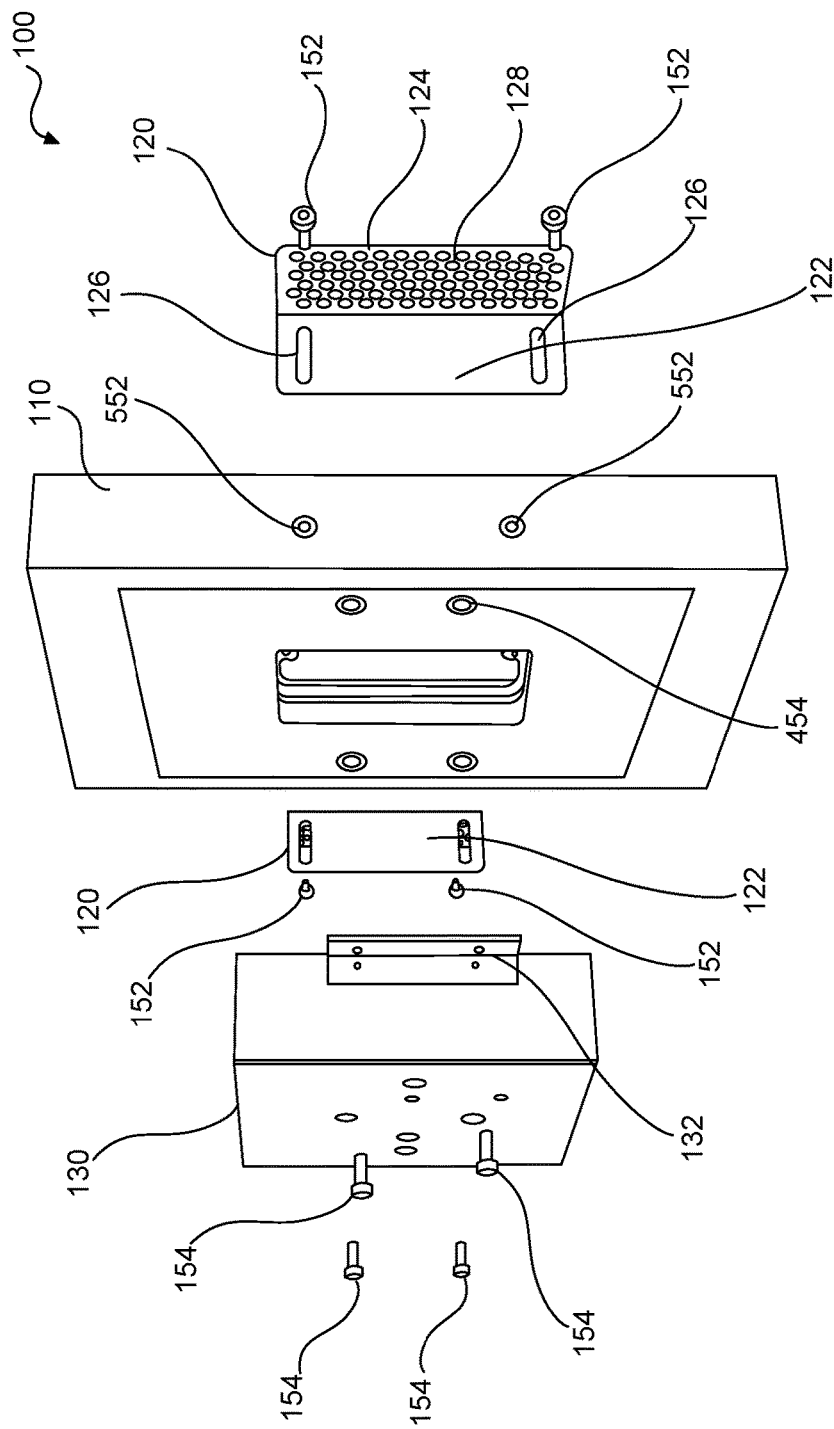
FIG. 3 is an exploded view of the recessed wall mounting fixture with optional electrical back box in accordance with one or more embodiments of the present invention.
Figure 4:
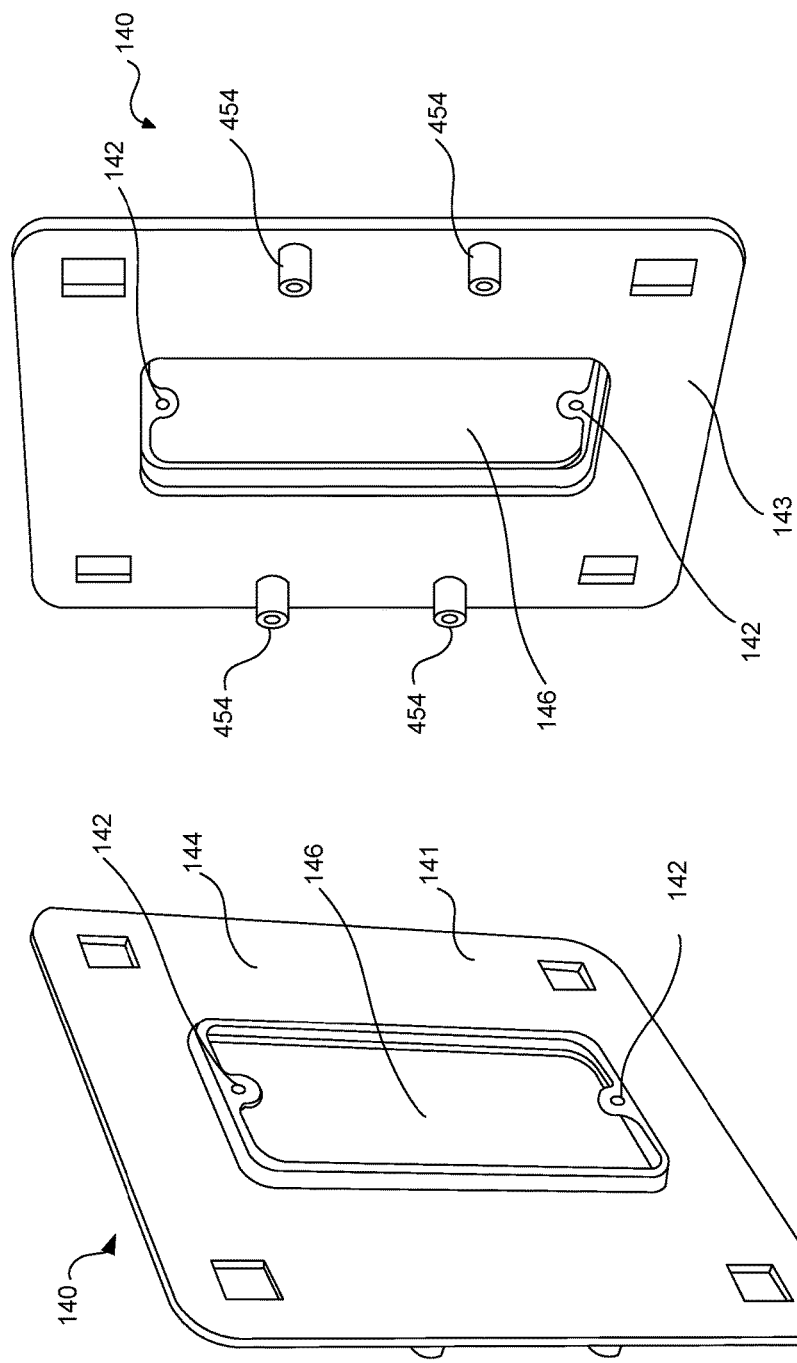
FIG. 4A is front perspective view of a mounting ring for the recessed wall mounting fixture in accordance with one or more embodiments of the present invention.
FIG. 4B is rear perspective view of the mounting ring of FIG. 4A.
Figure 5:
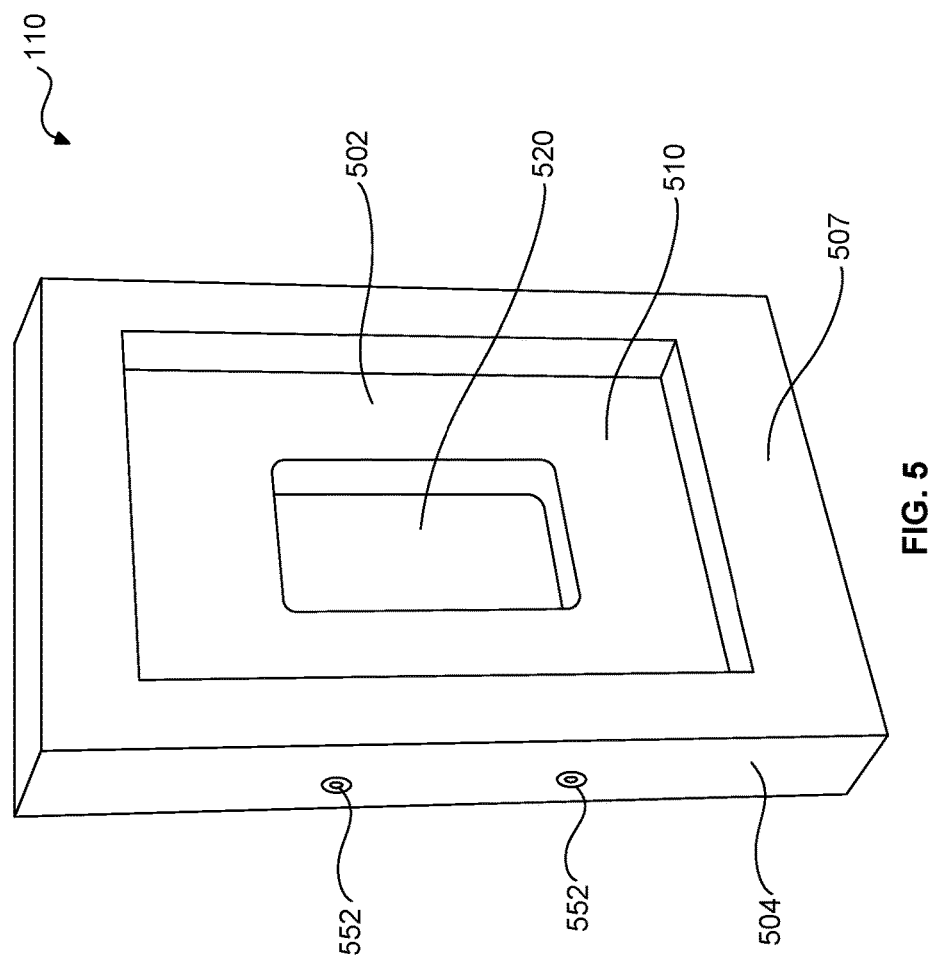
FIG. 5 is front perspective view of a housing unit without an embedded mounting ring for the recessed wall mounting fixture in accordance with one or more embodiments of the present invention.

The fixture 100 is configured to be coupleable to a wall of an architectural structure, e.g. drywall in a home or office, and substantially comprises a material that blends with the drywall. As illustrated in FIG. 3, fixture 100 comprises a housing unit 110; wall brackets 120; bolts/screws 152; and optional electrical back box 130 and associated bolts/screws 154.

In one or more embodiments, a mounting ring 140 is embedded into the housing unit 110. The mounting ring 140 is generally a flat plate with a perimeter 144 around an accessory window 146 that is configured for removably mounting an accessory device. Ring 140 further comprises one or more mounting flaps with threaded hole 142 on the perimeter of the accessory window for removably coupling the target accessory device.

The target accessory device, e.g. 810, may be a standard device that mounts in standard box sizes. For instance, standard box sizes for electrical outlets in the United States include "1-gang", "2-gang", and "3 gang" boxes, which generally denote the width of the electrical back box 130. Different accessory devices may require different shapes for the mounting ring 140, e.g. round, rectangular, etc. In one or more embodiments, the accessory device could be one or more of electrical outlets, switches (e.g. light), phone jacks, network jacks, TV outlets, HVAC grills, sensors (e.g. motion and occupancy), sprinklers, smoke detectors, speakers, keypads, lights, thermostats, etc.

Figure 6:
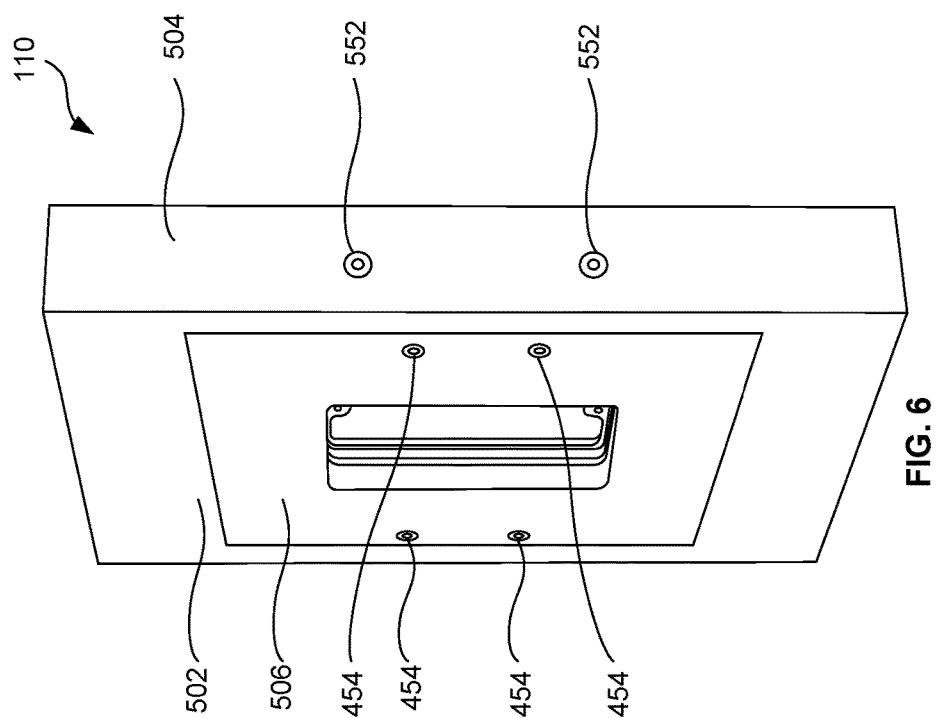
FIG. 6 is rear perspective view of a housing unit with an embedded mounting ring for the recessed wall mounting fixture in accordance with one or more embodiments of the present invention.
Figure 7:
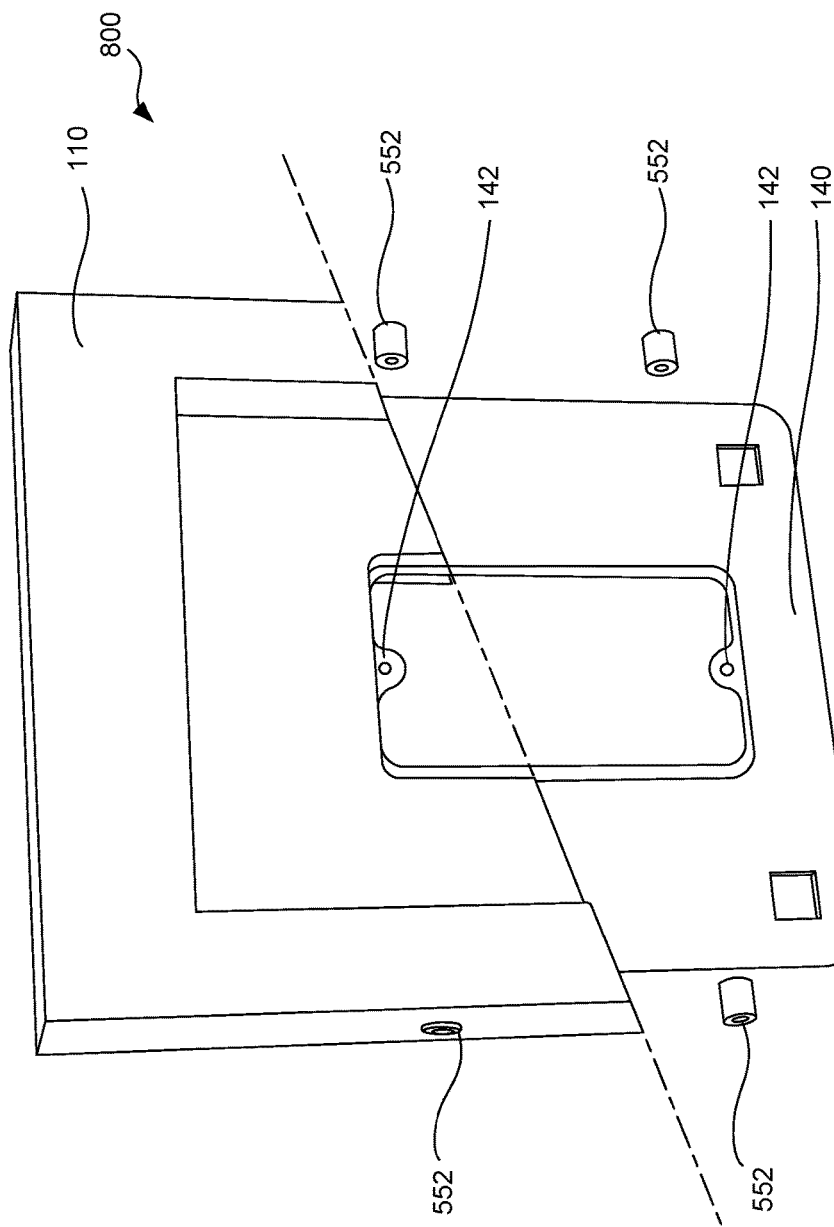
FIG. 7 is front perspective view of a housing unit of FIG. 6 with partial showing of the overmold.

In one or more embodiments, the housing unit 110 is fixedly coupled to the mounting ring 140. For example, the housing unit 110 may be an overmold formed by replica molding over the perimeter 144 of the mounting ring 140, perimeter wall threaded inserts 552 and optional base wall threaded inserts 454, using a master mold containing all the properly placed components, as illustrated in FIGS. 6 and 7. As illustrated in FIG. 7, the mounting ring is positioned such that its front face 141 is outwardly facing, i.e. towards the front side of the housing unit 110. The overmold could be Gypsum or other plaster materials, e.g. plastic, ceramic, etc. The overmold may be accomplished by pouring the molding material, e.g. Gypsum, in liquid form into a mold having the desired shape for the housing unit 110.

The mounting ring 140 may be coupled by other means to the housing unit, e.g. 110 and 1010. For instance, the mounting ring 140 may be bolted onto the backside 506 of the housing unit 110. The housing unit, e.g. 110 and 1010, may be available in different sizes, widths and depths and in different shapes. For example, round, square, rectangular, and other shapes are contemplated and would preferably depend on the device accessory to be mounted therein.

The housing unit 110 comprises a base wall 502 with a front side comprising an outwardly extending perimeter wall 504 from each side of the base wall 502 to form a recessed compartment 510, and terminating in an outer edge 507 that is configured to be flush with a wall of an architectural structure. In one or more embodiments, the base wall 502 has an access hole 520 configured to be substantially in alignment with the accessory window 146 of the mounting ring 140.

Thickness of the perimeter wall 504 and the base wall 502 of the housing unit 110 are configured to provide structural integrity to the fixture 100. This is particularly desirable to provide the appearance that the fixture is a contiguous part of the wall of the architectural structure.

In one or more embodiments, the housing unit 110 comprises one or more perimeter wall threaded inserts 552 secured in the perimeter wall of the housing unit 110 for coupling the one or more wall brackets 120. The perimeter wall threaded inserts 552 could be insert nuts, for example. The perimeter wall threaded inserts 552 are for coupling one or more wall brackets 120 to the housing unit 110 using bolts/screws 152, for example.

In one or more embodiments, the wall bracket 120 is adjustable and comprises a foot 122 and leg 124. As illustrated, an embodiment of the wall bracket 120 is L-shaped with the foot 122 configured with one or more slot holes 126 for coupling to the housing unit 110 via perimeter wall threaded inserts 552 and bolts/screws 152. Hole 126 is slotted to provide for adjustability of the housing unit 110 in an axis perpendicular to the wall of the architectural structure. Hole 126 may also be configured such that the housing unit is adjustable in an axis parallel to the wall of the architectural structure. Those of skill in the art would appreciate that hole 126 may be configured to provide several degrees of freedom in adjustability.

Figure 2:
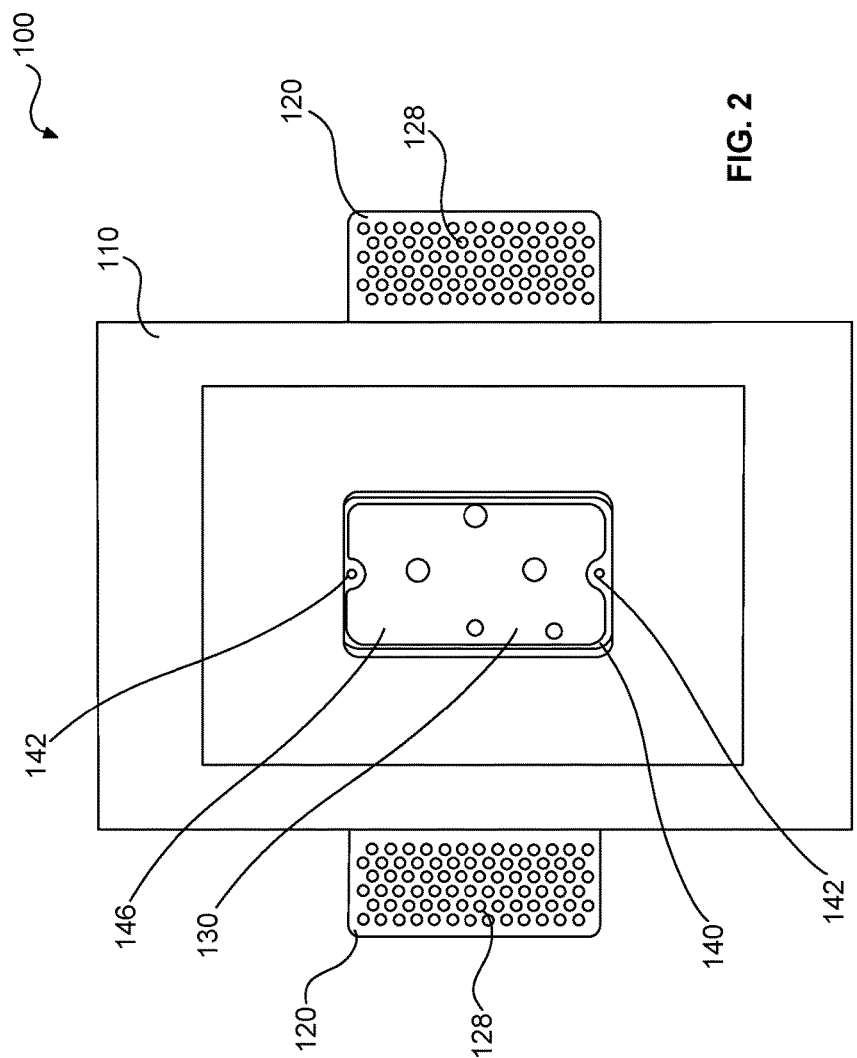
FIG. 2 is a front view of the recessed mounting fixture with optional electrical back box in accordance with one or more embodiments of the present invention.

The base leg 124 of bracket 120 comprises one or more holes 128 for coupling the fixture 100 to wall studs or to structural members attached to wall studs. One or more wall brackets may be coupled to opposing sides of the housing unit 110. For instance, a first bracket 120 may be coupled to the left side and a second bracket 120 coupled to the right side of the housing unit 110, as illustrated in FIG. 2. The number and location of bracket 120 coupled to the housing unit would depend on the desired structural integrity. For instance, one wall bracket may be used or more than two wall brackets may be used and the locations of the wall brackets on the housing unit may differ from that shown in the illustrations.

Figure 11:
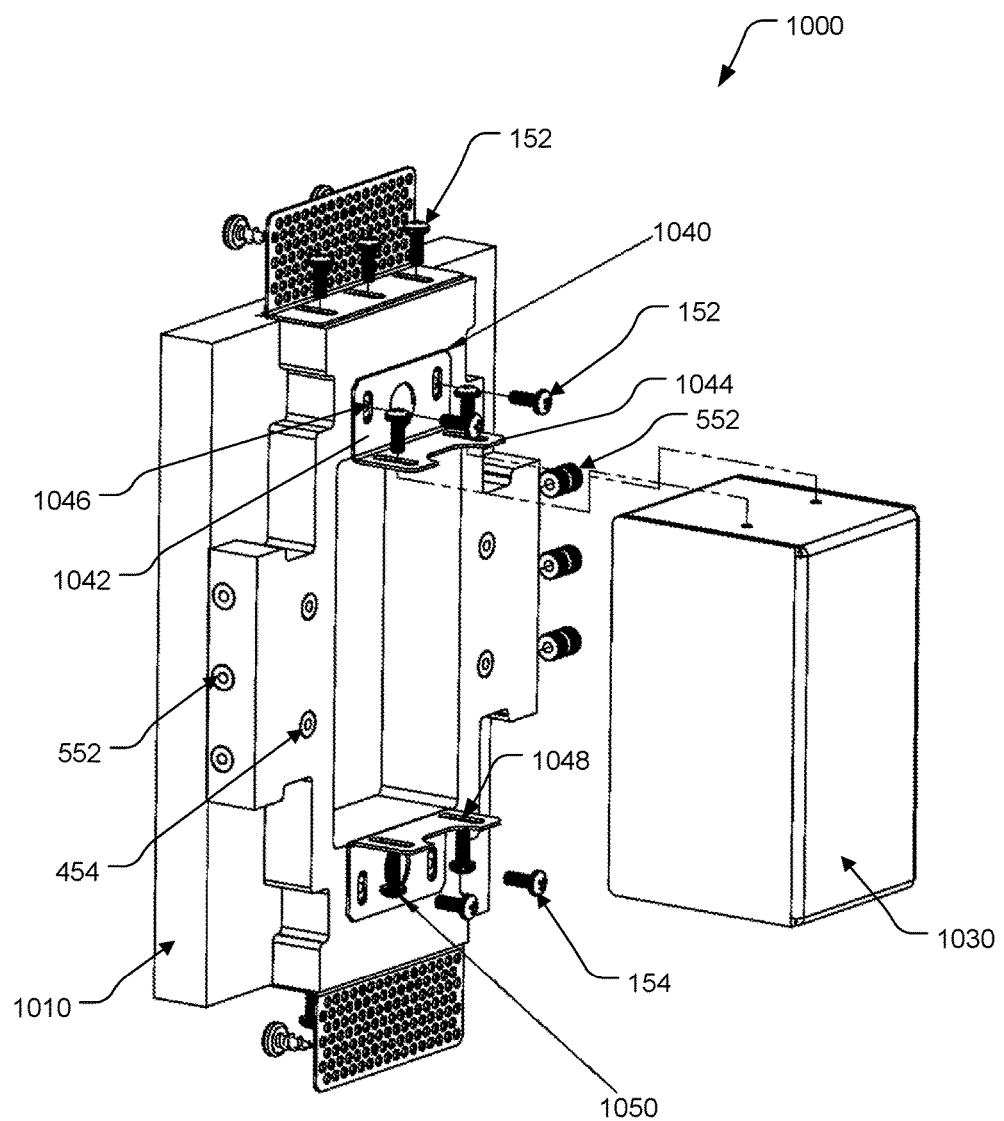
FIG. 11 is a partially exploded rear view of the configuration of FIG. 10 of the recessed wall mounting fixture.
Figure 12:
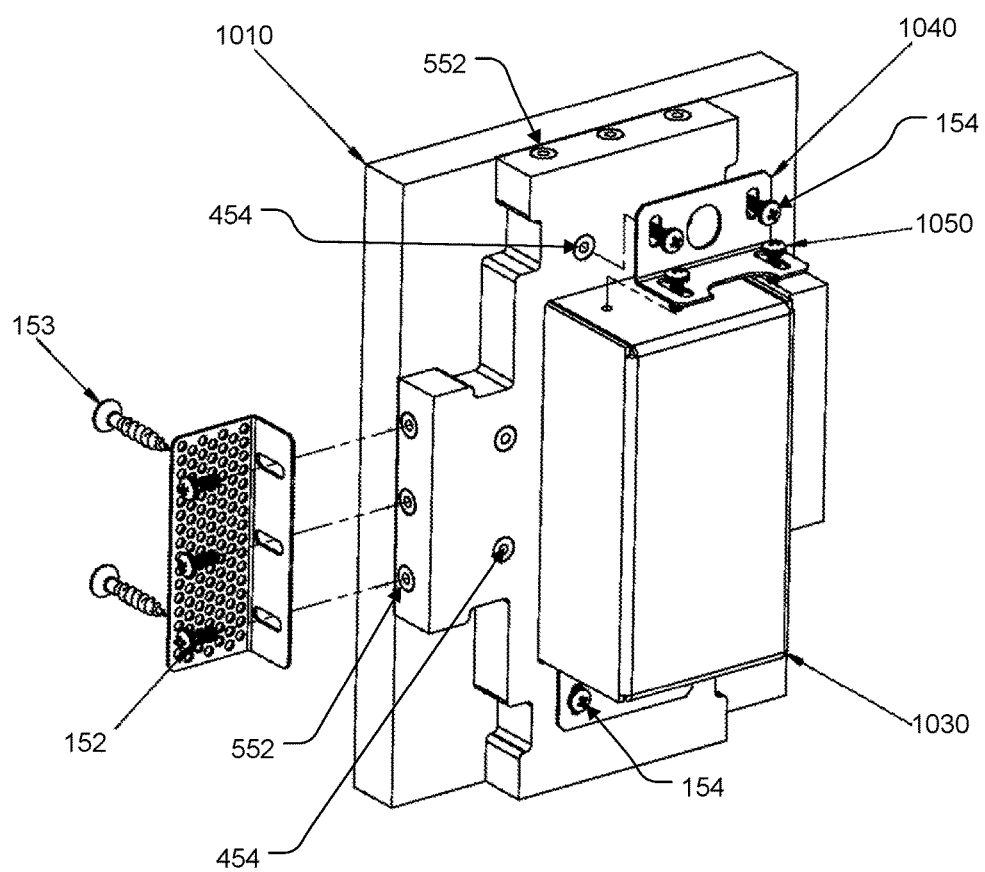
FIG. 12 is a rear perspective view of the configuration of FIG. 10 of the recessed wall mounting fixture with the right wall bracket and top box bracket exploded out in accordance with the present invention.

In one or more embodiments, the housing unit 110 further comprises one or more base wall threaded inserts 454 secured in the backside 506 of the base wall 502 of the housing unit 110 for externally coupling an electrical back box, e.g. 130, to the backside of the housing unit 110. The electrical back box, e.g. 130, may be coupled to the backside 506 of housing unit 110 via inserts 454 using one or more screws 154. Screw 154 is threaded through a hole 132 in the coupling bracket of the back box 130 into base wall insert 454 to couple the back box 130 to the base unit 110. The one or more base wall threaded inserts 454 in the backside 506 of the base wall 502 may be fixedly coupled to the back side 143 of the mounting ring 140, as illustrated in FIG. 4B, and/or embedded in the housing unit, e.g. 110 and 1010, as illustrated in FIG. 11.

In the embodiments illustrated in FIGS. 1-9, the electrical back box 130 is optional, thus fixture 100 may be configured without the optional electrical back box 130 for low voltage applications, e.g. phone jacks, network jacks, TV outlets, etc.

Figure 8:
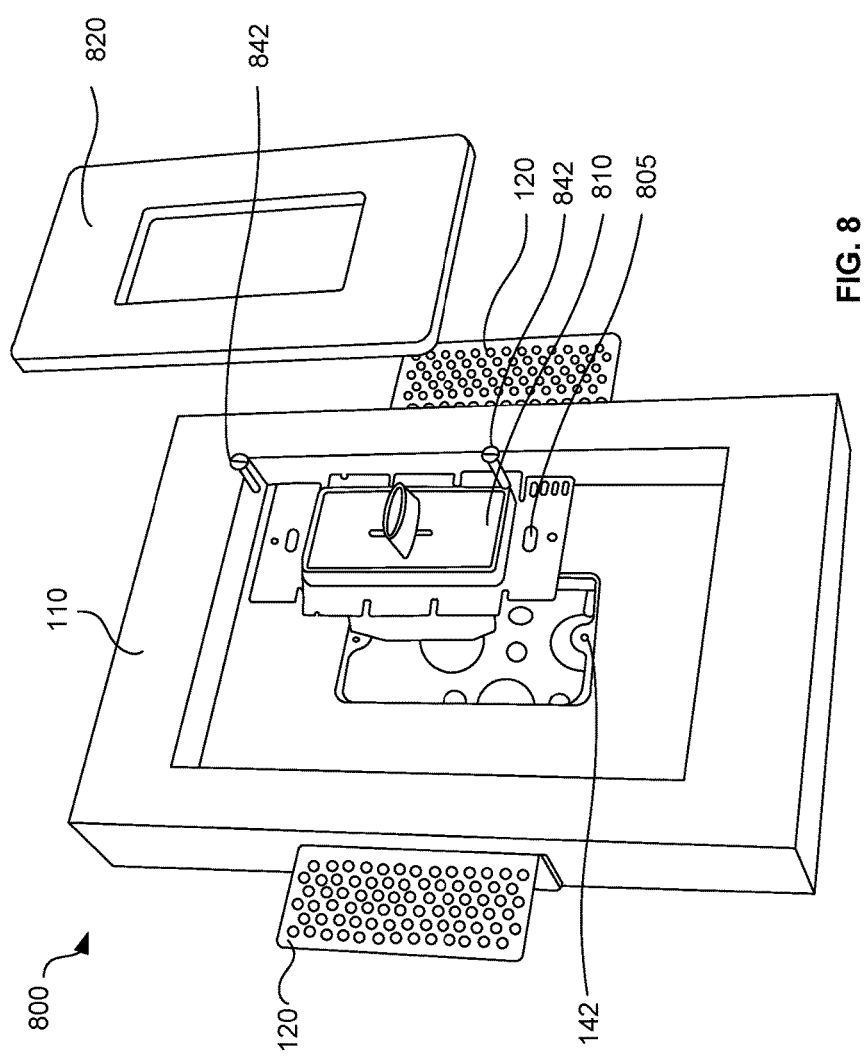
FIG. 8 is an exploded view showing the recessed wall mounting fixture and the components of a variable light switch in accordance with one or more embodiments of the present invention.
Figure 9:
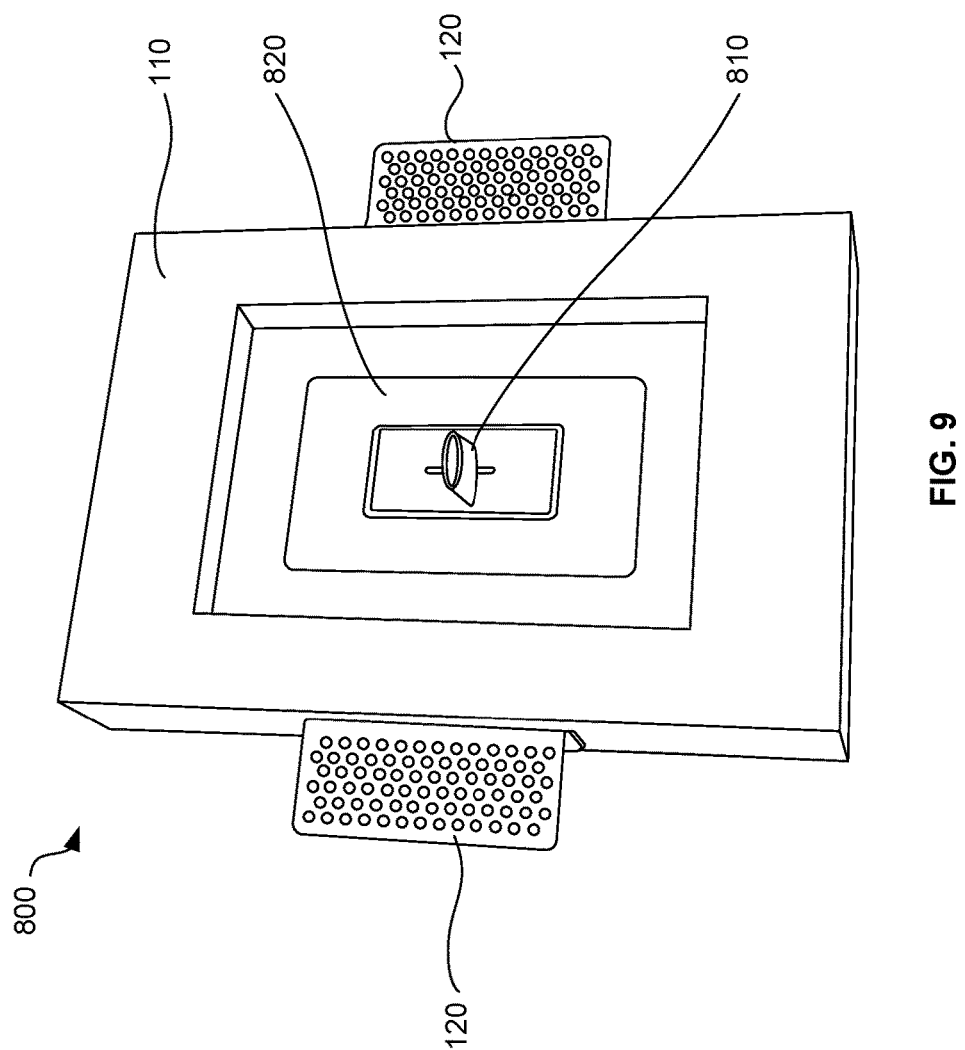
FIG. 9 is an assembled view of the recessed wall mounting fixture and the variable light switch of FIG. 8.

FIGS. 8 and 9 are illustrations of an exemplary coupling of the fixture 100 with variable light switch 810, in accordance with an embodiment of the present invention. FIG. 8 is an exploded view showing fixture 100 and the components of the variable light switch. FIG. 9 is an assembled view of fixture 100 and the variable light switch.

Figure 1:
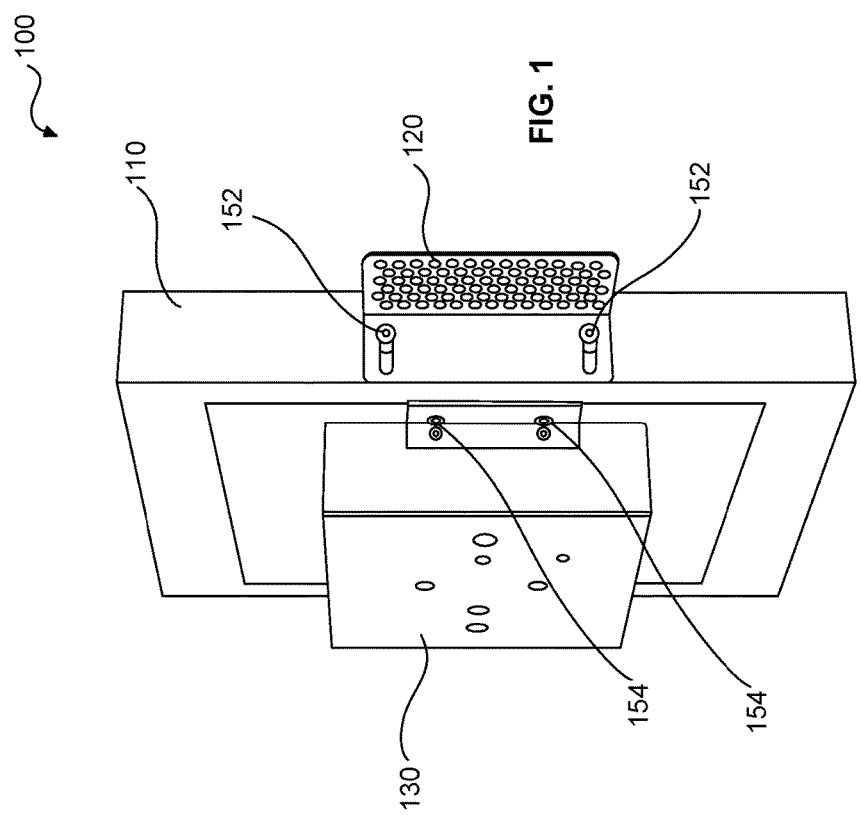
FIG. 1 is a rear perspective view of the recessed mounting fixture with optional electrical back box in accordance with one or more embodiments of the present invention.

As illustrated in FIG. 8, the fixture 100 includes all the components illustrated in FIGS. 1 and 2, i.e. housing unit 110; wall brackets 120; and optional electrical back box 130. The components for installation of the variable light switch include switch 810 with mounting holes 805 at the bottom and top end; mounting screw 842 that are configured to fit through mounting hole 805 and screw into the threaded hole in flap 142, thereby securing switch 810 to ring 140; and cover 820 which fits over and covers up the internals of switch 810, as illustrated in FIG. 9.

In another embodiment of the invention comprises recessed wall mounting apparatus 1000 for recess mounting of an assorted variety of devices, e.g. architectural fixtures, so that they are more concealed and less obtrusive.

Figure 10:
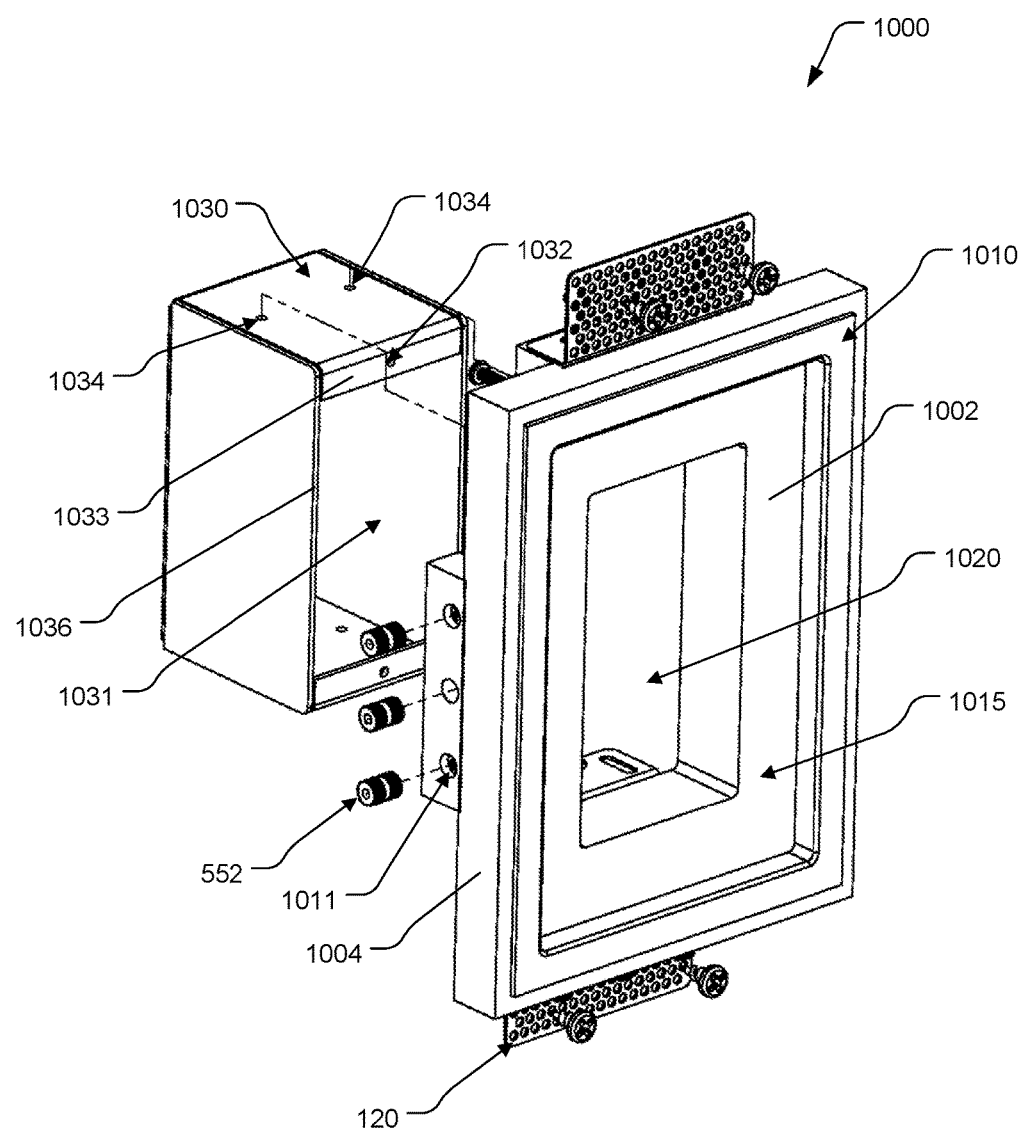
FIG. 10 is a partially exploded front view of another configuration of the recessed wall mounting fixture with a back box in accordance with one or more embodiments of the present invention.

As illustrated in FIGS. 10-14, the fixture 1000 is configured to be coupleable to a wall of an architectural structure, e.g. drywall in a home or office, and substantially comprises a material that blends with the drywall. As illustrated in FIG. 10, fixture 1000 comprises a housing unit 1010; wall brackets 120; mounting bolts/screws 152; back box 1030 and back box brackets 1040.

In one or more embodiments, the housing unit 1010 comprises a base wall 1002 with a front side comprising an outwardly extending perimeter wall 1004 from each side of the base wall 1002 to form a recessed compartment 1015, and terminating in an outer edge 1007 that is configured to be flush with a wall of an architectural structure. In one or more embodiments, the base wall 1002 has an access hole 1020 configured for removably mounting an accessory device, e.g. 810.

Thickness and shape of the perimeter wall 1004 and the base wall 1002 of the housing unit 1010 are configured to provide structural integrity to the fixture 1000. This is particularly desirable to provide the appearance that the fixture is a contiguous part of the wall of the architectural structure.

In one or more embodiments, the housing unit 1010 comprises one or more perimeter wall threaded inserts 552 coupled to the perimeter wall 1004 of the housing unit 1010 for coupling the one or more wall brackets 120. For example, one or more perimeter wall threaded inserts 552 may be located on any opposing sides of perimeter wall 1004. The perimeter wall threaded inserts 552 could be insert nuts, for example. The perimeter wall threaded inserts 552 may be used for coupling one or more brackets 120 to the housing unit 1010 using bolts/screws 152, for example.

In one or more embodiments, the housing unit 1010 is a mold formed by replica molding using a master mold with the desired shape, as illustrated in FIGS. 10 and 11. The mold could be Gypsum or other plaster materials, e.g. plastic, ceramic, etc. For instance, the housing unit may be produced by pouring the molding material, e.g. Gypsum, in liquid form into a mold having the desired shape for the housing unit 1010. Those of skill in the arts would appreciate that the housing unit, e.g. 110 and 1010, may also be constructed from other materials, e.g. wood, metals, composites, etc.

After the housing unit is formed (e.g. by molding, machining etc.), holes, e.g. 1011, for retaining one or more perimeter wall threaded inserts 552 could be made, e.g. by drilling, on the outside of the perimeter wall 1004. In the illustrated example of FIG. 11, three perimeter wall threaded inserts 552 are coupled to each opposing side of the outside of perimeter wall 1004, e.g. top and bottom, and left and right of the illustration. Also, holes for retaining one or more base wall threaded inserts 454 could be made, e.g. by drilling, on the backside 1006 of the base wall 1002. In the illustrated example of FIG. 11, two base wall threaded inserts 454 are coupled to each opposing side of the backside of base wall 1002, e.g. top and bottom, and left and right of the illustration.

In another embodiment, the housing unit 1010 is a mold formed by replica molding over components comprising one or more perimeter wall threaded inserts 552 and optionally one or more base wall threaded inserts 454, using a master mold containing all the properly placed components, as discussed above. The mold could be Gypsum or other plaster material, e.g. plastic, ceramic, etc. The housing unit may be produced by pouring the molding material, e.g. Gypsum, in liquid form into a mold having the desired shape for the housing unit 1010. The housing unit may also be constructed as a machined or carved part, for example.

In one or more embodiments, the bracket 120 is coupleable to the housing unit 1010 via perimeter wall threaded inserts 552 and bolts/screws 152. Hole 126 is slotted to provide for adjustability of the housing unit 1010 in an axis perpendicular to the wall of the architectural structure. Hole 126 may also be configured such that the housing unit is adjustable in an axis parallel to the wall of the architectural structure. Those of skill in the art would appreciate that hole 126 may be configured to provide several degrees of freedom in adjustability.

Figure 14A:
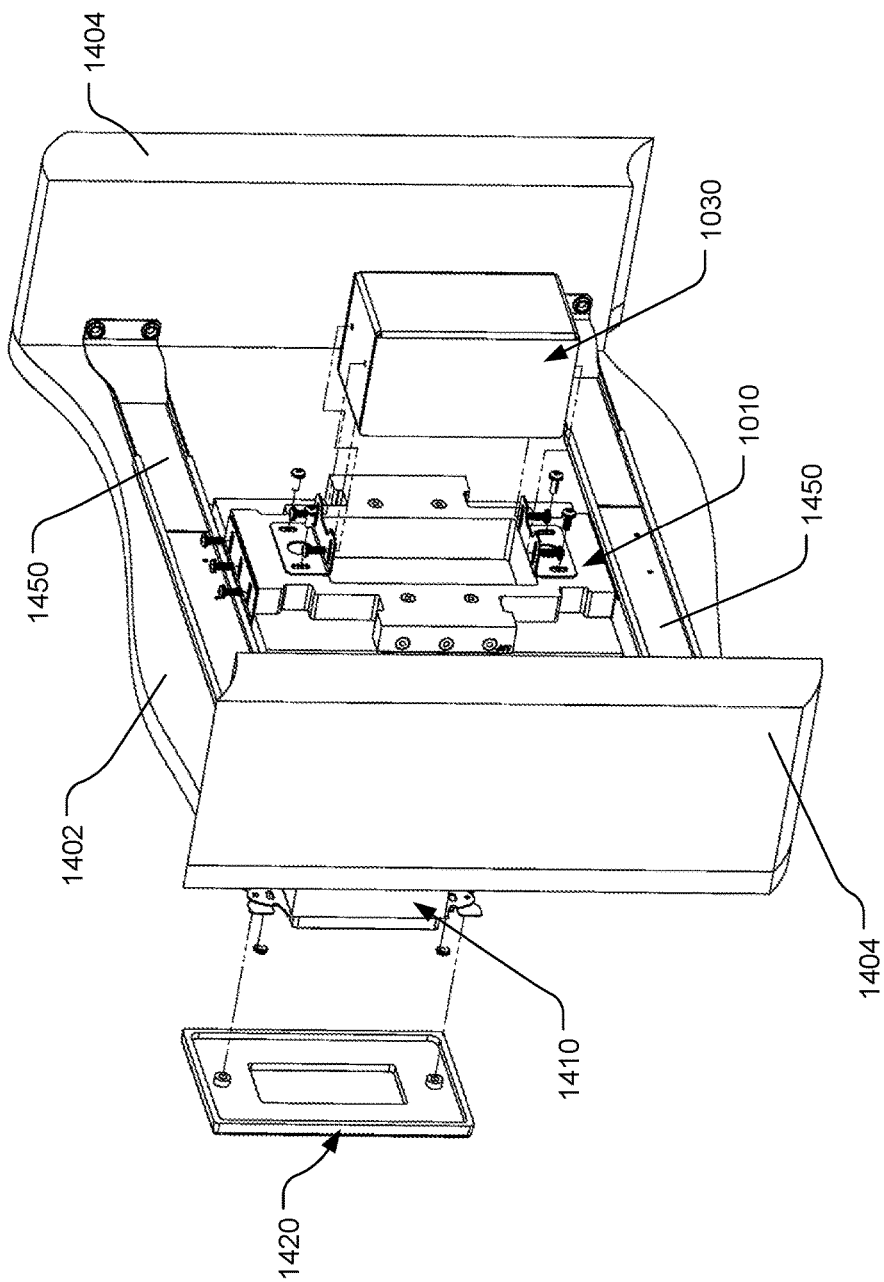
FIG. 14A is a partially exploded rear perspective view of the configuration of FIG. 10 showing coupling of the recessed wall mounting fixture and the components of a light switch to an architectural structure.

The base leg 124 of the bracket 120 comprises one or more holes 128 for coupling the fixture 1000 to wall studs or to structural members, e.g. 1450, attached to wall studs, e.g. 1404, in FIG. 14A. One or more wall brackets 120 may be coupled to opposing sides of the housing unit 1010. For instance, a first bracket 120 may be coupled to the left side and a second bracket 120 coupled to the top side of the housing unit 1010, as illustrated in FIG. 10. The number and location of bracket 120 coupled to the housing unit 1010 would depend on the desired structural integrity of the fixture 1000. For instance, one wall bracket may be used or more than two wall brackets may be used and the locations of the wall brackets on the housing unit may differ from that shown in the illustrations.

In one or more embodiments, the one or more base wall threaded inserts 454 secured in the backside 1006 of the base wall 1002 of the housing unit 1010 is configured for externally coupling a back box, e.g. 1030, to the backside of the housing unit 1010. The back box, e.g. 1030, may be coupled to the backside 1006 of housing unit 1010, e.g. for high voltage devices such as power outlets and switches, using back box brackets 1040.

In one or more embodiments, the box bracket 1040 is coupleable to the housing unit 1010 via base wall threaded inserts 454 and bolts/screws 154. The size of back box 1030 coupled to housing 1010 may vary and would depend on the application, i.e. target accessory. Also, the box brackets may be placed horizontally or vertically, depending on the size and shape of the back box.

In one or more embodiments, the box bracket 1040 comprises a foot 1042 and leg 1044. As illustrated, an embodiment of the box bracket 1040 is L-shaped with the foot 1042 configured with one or more holes 1046 for coupling to the housing unit 1010 via base wall threaded inserts 454 and bolts 154, and leg 1044 configured with one or more holes 1048 for securing back box 1030 to housing unit 1010 via threaded holes 1034 with bolts 1050.

In one or more embodiments, the front side of back box 1030 comprises a mounting ring 1036 configured for removably mounting a target accessory device. The mounting ring comprises one or more mounting flaps 1033 with one or more threaded hole 1032 for removably coupling a target accessory device, and an accessory window 1031. The backside 1038 of back box 1030 may be open or closed, depending on the application. The backside 1038 may also include a plurality of holes (not shown) for high voltage applications, e.g. as in standard electrical gang boxes. The back box 1030 may be optional, thus fixture 1000 may be configured without the back box 1030 for low voltage applications, e.g. phone jacks, network jacks, TV outlets, etc.

Figure 14B:
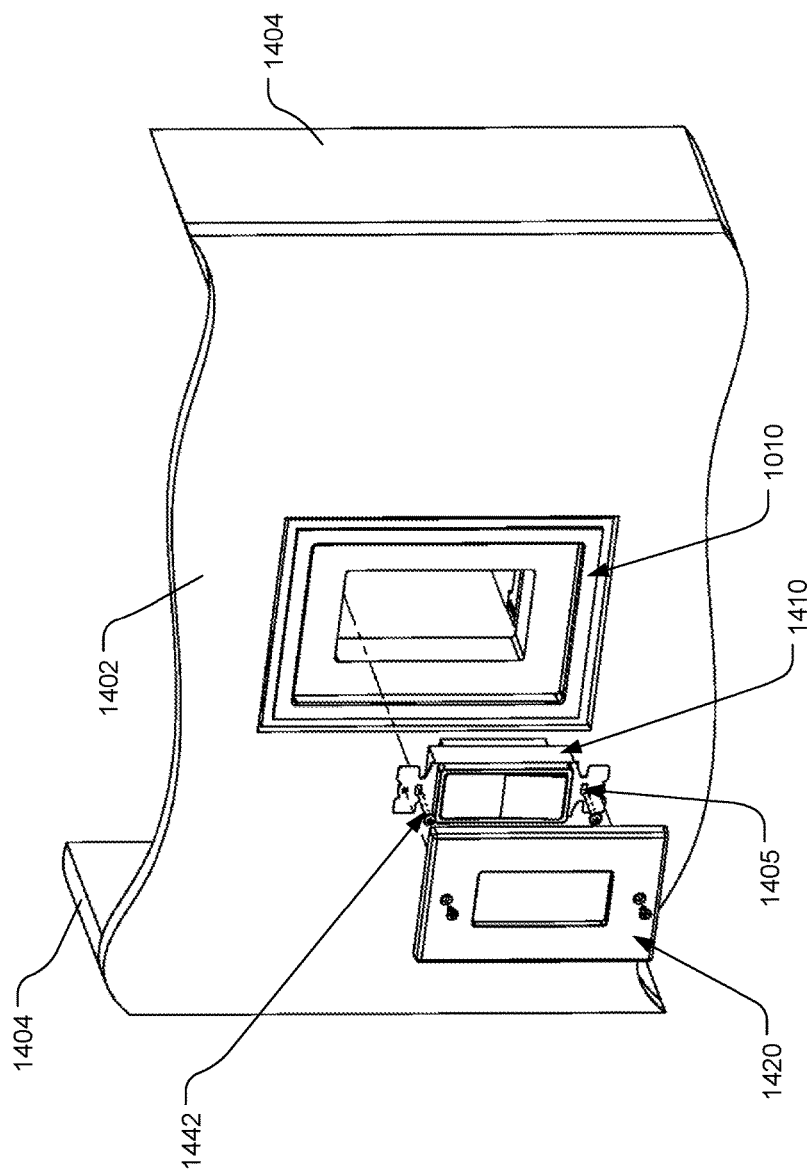
FIG. 14B is a partially exploded front perspective view of the illustration of FIG. 14A.

FIGS. 14A and 14B are illustrations of an exemplary coupling of the fixture 1000 with light switch 1410, in accordance with an embodiment of the present invention. FIG. 14A is a partially exploded rear perspective view showing coupling of fixture 1000 and the components of the light switch 1410 to an architectural structure. FIG. 14B is a partially exploded front perspective view of the illustration of FIG. 14A.

As illustrated, the fixture 1000 is mounted to drywall 1402 via one or more external mounting brackets 1450 that are coupled to opposing wall studs 1404. Fixture 1000 is coupled to the external mounting brackets 1450 (or to wall studs) using wall brackets 120 that are located at the top and bottom sides, or left and right sides, of the housing unit 1010 using appropriate mounting hardware, e.g. screws 153. The components for the installation include switch 1410 with mounting holes 1405 at the bottom and top end; mounting screw 1442 that are configured to fit through mounting hole 1405 and screw into the threaded hole 1032 in the flap 1033 of the ring of back box 1030, thereby securing switch 1410 to back box 1030; and cover 1420 to fit over and cover the internals of switch 1410.

While the invention herein disclosed has been described by means of specific embodiments and applications thereof, numerous modifications and variations could be made thereto by those skilled in the art without departing from the scope of the invention set forth in the claims.

What is claimed is:

1. A recessed wall mounting apparatus comprising:
   a mounting ring configured for removably mounting an accessory device, wherein the mounting ring comprises an accessory window;
   a housing unit comprising a base wall and an outwardly extending perimeter wall around the base wall that terminates in an outer edge that is configured to be flush with an architectural structure wall, wherein the base wall and the perimeter wall define a recessed compartment for the accessory device, wherein the base wall has a centrally located access hole for the accessory device, wherein the mounting ring is embedded inside the base wall such that said accessory window is substantially aligned with the access hole;
   one or more wall brackets, wherein each wall bracket has one or more slotted holes for adjustably coupling the wall bracket to said housing unit, wherein said slotted holes enable alignment of said housing unit with said architectural structure wall.

2. The recessed wall mounting apparatus of claim 1, wherein the accessory device is selected from a group consisting of electrical outlets, switches, phone jacks, network jacks, Television outlets, HVAC (Heating, Ventilation and Air Conditioning) grills, sensors, sprinklers, smoke detectors, speakers, keypads, lights, and thermostats.

3. The recessed wall mounting apparatus of claim 1, wherein the housing unit comprises a gypsum mold.

4. The recessed wall mounting apparatus of claim 1, wherein the housing unit comprises a gypsum overmold on said mounting ring.

5. The recessed wall mounting apparatus of claim 1, wherein the one or more brackets is adjustable in an axis perpendicular to the architectural structure wall.

6. The recessed wall mounting apparatus of claim 1, wherein the housing unit comprises one or more perimeter wall threaded inserts secured in the perimeter wall of the housing unit for coupling said one or more wall brackets.

7. The recessed wall mounting apparatus of claim 6, wherein the one or more perimeter wall threaded inserts comprises insert nuts.

8. The recessed wall mounting apparatus of claim 1, wherein the mounting ring comprises one or more base wall threaded inserts fixedly coupled to the backside of the mounting ring for securing a back box.

9. The recessed wall mounting apparatus of claim 1, wherein the housing unit comprises one or more base wall threaded inserts secured in the backside of the base wall of the housing unit for externally coupling a back box to the backside of the housing unit.

10. The recessed wall mounting apparatus of claim 1, wherein the housing unit comprises one or more base wall threaded inserts fixedly coupled to said mounting ring for externally coupling a back box to the backside of the housing unit.

11. The recessed wall mounting apparatus of claim 1, wherein the housing unit is coupleable to a drywall of the architectural structure and comprises molding material that blends with the drywall.

12. A recessed wall mounting apparatus comprising:
a back box configured for removably mounting an accessory device, wherein the back box comprises an accessory window;
a housing unit comprising a base wall and an outwardly extending perimeter wall around the base wall that terminates in an outer edge that is configured to be flush with an architectural structure wall, wherein the base wall and the perimeter wall define a recessed compartment for the accessory device, wherein the base wall has an access hole for the accessory device, wherein the back box is coupled to the backside of the base wall such that said accessory window is substantially aligned with the access hole;
one or more perimeter wall threaded inserts secured inside the perimeter wall of the housing unit; and
one or more wall brackets, wherein each wall bracket has one or more slotted holes for adjustably coupling the wall bracket to said housing unit at said one or more perimeter wall threaded inserts, wherein said slotted holes enable alignment of said housing unit with said architectural structure wall.

13. The recessed wall mounting apparatus of claim 12, wherein the housing unit comprises a gypsum mold.

14. The recessed wall mounting apparatus of claim 12, wherein the one or more wall brackets is adjustable in an axis perpendicular to the architectural structure wall.

15. The recessed wall mounting apparatus of claim 12, wherein the housing unit comprises one or more perimeter wall threaded inserts secured in the perimeter wall of the housing unit for coupling said one or more wall brackets.

16. The recessed wall mounting apparatus of claim 15, wherein the one or more perimeter wall threaded inserts comprises insert nuts.

\* \* \* \* \*